Feb. 18, 1958   L. J. BOBB   2,824,178
TRANSDUCERS
Filed April 26, 1954
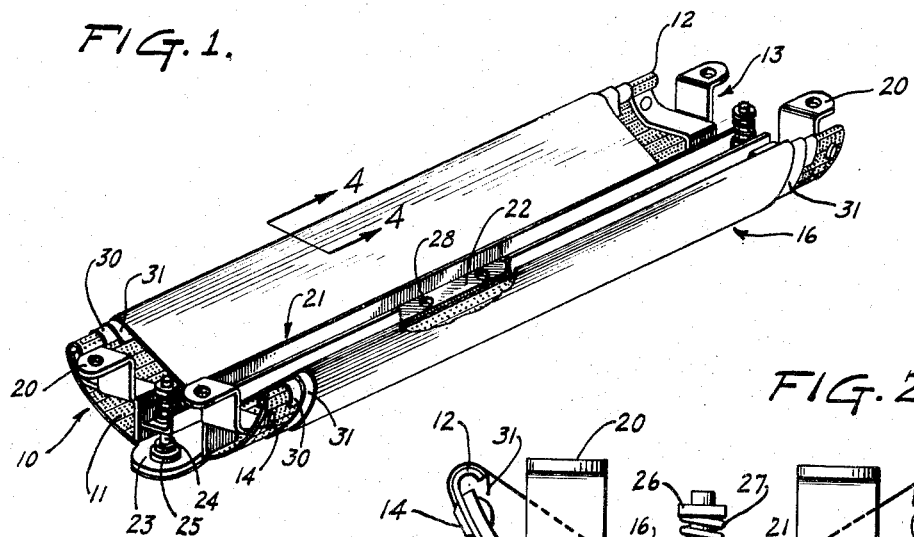
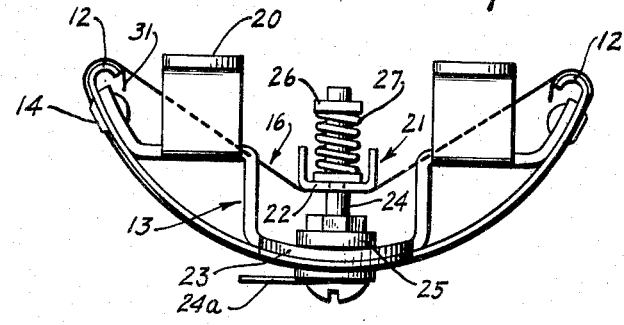
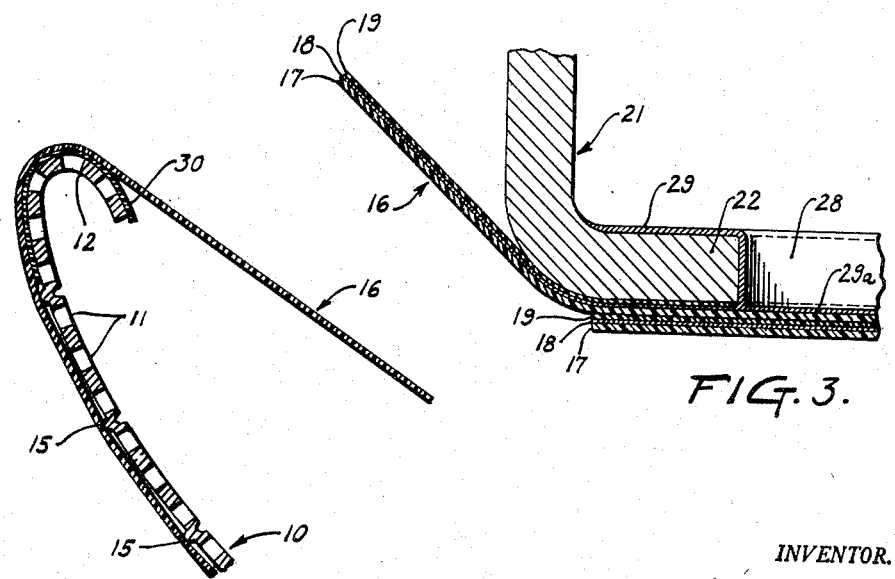
INVENTOR.
LLOYD J. BOBB
BY
Brown, Jenks & Synnestvedt
AGENTS United States Patent Office 2,824,178
Patented Feb. 18, 1958

2,824,178

TRANSDUCERS

Lloyd J. Bobb, Glenside, Pa., assignor to Philco Corporation, Philadelphia, Pa., a corporation of Pennsylvania Application April 26, 1954, Serial No. 425,607

11 Claims. (Cl. 179—111)

My invention, hereinafter disclosed and claimed, relates to electro-acoustic transducers of the electrostatic or condenser type. While my invention may be embodied in a variety of such transducers, the principles of the invention are of particular utility in the field of electrostatic sound reproducers, or speakers, adapted for use in radio receivers of the wide range, so-called "high-fidelity" type.

Electrostatic reproducers have been known for some time and their low distortion characteristics have been recognized. However little commercial use has been made of such equipment, primarily because of difficulties which have been encountered in manufacturing the apparatus and because of operational deficiencies, particularly as respects sensitivity, stability, and long life.

Broadly, it is the objective of the present invention to provide an improved electrostatic transducer of a highly reliable type, transducers constructed in accordance with the invention being capable of maintaining stable operating characteristics over extended periods of time, and yet being susceptible of simple and inexpensive manufacture.

With more particularity my invention has as an object the provision of an electrostatic reproducer having novel and improved means for placing and maintaining the vibratile membranous diaphragm under tension, the tensioning means being of such a nature as to compensate, automatically, for variations in diaphragm tension resulting from temperature changes or from cold flow. The tensioning means is further characterized not only by its simplicity, but also by the fact that all portions of the diaphragm are substantially uniformly stressed. In prior apparatus it has been common to provide tensioning means of such a nature as to subject localized diaphragm areas to excessively high tensile stresses.

In one aspect of the invention it is an object to provide an electrostatic transducer in which the diaphragm tensioning means is also used in establishing electrical contact between the diaphragm and a source of potential.

It is a feature of the invention that the diaphragm is mounted upon the backing plate and maintained under proper tension through the sole agency of means bearing against said diaphragm. No gripping or clamping devices are required, since no tensile forces are applied between the diaphragm and the tensioning means.

In the achievement of the foregoing objectives, and with reference to a preferred embodiment of my invention, I utilize a foraminous backing plate having a concave side and a convex side and which plate comprises one electrode of the condenser. Preferably the plate is of partially cylindrical form. The backing plate is encircled by a sleeve-like membranous diaphragm which comprises the other electrode of the condenser, and a metallic rod or member confronts the concave side of the backing plate and extends along the latter in contact with the sleeve-like diaphragm, said member reacting between the backing plate and diaphragm to maintain the diaphragm under the requisite tension. It is a feature of the invention that the tensioning member serves also as a means for establishing electrical contact between the diaphragm and a source of potential. Further features of the invention have to do with the various coatings which are applied to the diaphragm and with a novel way in which good conductive contact, between the tensioning member and the diaphragm is insured.

It has only recently become possible to utilize the extremely thin diaphragm which is required for high sensitivity, and difficulties are encountered when attempts are made to utilize prior art arrangements to maintain such a thin diaphragm under the requisite tension, and to establish conductive contact between the diaphragm and a source of potential. These difficulties have been eliminated by the present invention which makes it possible to employ the very thin dielectric diaphragm sheets now available.

The manner in which the foregoing objects and advantages of my invention may best be achieved will be more fully understood from a consideration of the following detailed description taken together with the accompanying drawing, in which there is illustrated a preferred embodiment of my invention.

In the drawing:

Figure 1 is a perspective view of an electrostatic sound reproducer embodying the principles characteristic of my invention;

Figure 2 is an end elevational view illustrating, on a larger scale, apparatus of the kind shown in Figure 1;

Figure 3 is a fragmentary sectional view on a greatly enlarged scale, and illustrating certain features of the diaphragm tensioning means; and, Figure 4 is a greatly enlarged fragmentary sectional view taken, generally, in the direction indicated by the line 4—4 applied to Figure 1.

Now making more detailed reference to the drawing, and initially to Figures 1 and 2 thereof, it will be seen that the reproducer or speaker comprises a foraminous, electrically conductive, rigid backing plate 10 having a concave side and a convex side. This shape has certain inherent advantages, such as rigidity, low cost and wide distribution of high frequency energy. Heretofore, however, these advantages could not be achieved in a satisfactory commercial product because prior designs have been unreliable and of low sensitivity.

Preferably the plate is fabricated of a sheet of metal; for example light gauge aluminum has been found to be satisfactory. As indicated, the plate is foraminous and in this regard it will be noted that it is provided with a very large number of minute circular apertures or perforations 11, and since the diameter of these perforations is large as compared with the axial length thereof (defined by the thickness of the sheet) a high degree of acoustical transparency is achieved. As will be understood it is important that the backing plate be, essentially, acoustically transparent in order to minimize power losses due to acoustic resistance of air between the backing plate and the vibratile diaphragm.

Backing plate 10 terminates in rolled edges 12 (see particularly Figure 2) and is provided, at each of its ends, with a bracket member 13 riveted or otherwise secured to the backing plate, as at 14. This bracket serves adjustably to support the diaphragm tensioning means and also is utilized as a mounting member and as electrical contact means, in a manner described in what follows.

As appears at 15 (see Figure 4) the metallic backing plate 10 is embossed to provide a plurality of elongated ridges extending axially of the plate and projecting from its convex side. These ridges may be provided in other ways, for example by the use of very small diameter threads or wires overlying the backing plate. The ridges provide means for spacing the diaphragm from the backing plate, as will be later described, and may project from the plate a very short distance, for example 0.004".

The diaphragm 16 is sleeve-like in nature and is disposed about the backing plate, as clearly appears in Figures 1 and 2. It extends across and is maintained in spaced relation with respect to the concave side of the backing plate, and closely encircling the convex side of said plate, where it is supported upon the aforesaid ridges 15. As shown in Figure 3 the diaphragm base element comprises a very thin (0.0025") sheet 17 of mechanically elastic, dielectric material. A Type "A" polyester manufactured by E. I. du Pont de Nemours & Co., and supplied by Minnesota Mining and Manufacturing Co. under the designation Mylar, has proven very satisfactory for the purposes of the invention. Other materials, for example polyvinyl chloride, may be utilized. The material to be employed can be specified in terms of a number of physical characteristics, including: mechanical elasticity; low conductivity; high mechanical strength; and long life. In addition the sheet must be truly imperforate, since each minute aperture in the diaphragm may cause arcing and local damage to the conductive coating (shown at 18) which is deposited upon the base element of the diaphragm. This electrically conductive coating is extremely thin—a thickness of about 1 or $2 \times 10^{-6}$ inch having given good results—and aluminum may conveniently be utilized to form the coating. Gold, silver, and other electrically conductive metals are also suitable. When aluminum is used it is desirable to protect the conductive coating 18 against contact with moisture, oils, or other contaminants which may be present in the atmosphere, and to this end the conductive coating 18 is provided with a very thin protective varnish-like coating 19 which may advantageously comprise vinyl plastic material.

It will be understood that the non-conductive Mylar sheet 17 forms the inner surface of the sleeve-like diaphragm 16 and is therefore disposed in contact with the aforesaid ridges 15 which project from the backing plate 10. Thus the conductive coating 18 is spaced from the backing plate 10 by a distance equal to the spacing maintained by the ridges 15 plus the thickness of the Mylar base sheet 17.

In practice both polarizing and signal voltages are applied between the conductive coating 18 and the aluminum backing plate 10 and, in one embodiment which has yielded very satisfactory results, the polarizing potential has been equal to about 300 volts whereas the signal has been equal to 100 volts R. M. S. The membranous diaphragm should of course be as thin as possible in order to achieve maximum sensitivity. As indicated above, it has been found that material of the type preferably employed may be very thin yet not break down under the applied potential. The ohmic resistance of the conductive coating 18 is kept as low as possible, in order to insure maximum power output and uniform frequency response.

In particular accordance with the present invention, novel means is provided for placing and maintaining the vibratile membranous diaphragm under tension, it being a feature of the tensioning means that no gripping or clamping devices are required since no tensile forces are applied between the diaphragm and the tensioning means. As stated above the tensioning devices which have been utilized prior to this invention are entirely unsuitable for placing and maintaining under tension a very thin diaphragm of the kind employed in the highly sensitive speakers which can be constructed in accordance with the invention.

As will later appear it is also an important characteristic of apparatus constructed in accordance with my invention that the diaphragm tensioning means serves also as means for establishing electrical contact between the diaphragm and a source of potential. In this latter regard it will be recognized that the backing plate 10 serves as one electrode of the capacitor, the conductive coating 18, which is spaced from the backing plate through the agency of the plastic sheet 17, comprising the other electrode. Electrical contact to the backing plate may be established through one or more of the lugs 20, which also provide means for mounting the reproducer, and the manner in which electrical contact with the coated portion of the diaphragm is established through the tensioning means will be considered in what follows.

Respecting diaphragm tension, it should be understood that tensile forces set up in the diaphragm impart mechanical stiffness which is in opposition to the electrostatic forces which tend to cause the diaphragm to approach the backing plate. Sufficient tension should be applied to the diaphragm to prevent it, under the influence of the electrostatic forces resulting from the applied voltage, from approaching too closely to the backing plate. In the absence of this degree of mechanical tension, electrostatic forces would move the diaphragm into contact with the backing plate and maintain it in such position, thereby interfering with proper operation of the reproducer. It is of importance to note that the tension should not be so great as to bring the resonant frequency of the diaphragm, as a whole, into the response range of the speaker. Although a speaker of this type is capable of some response in the lower frequency portion of the audio spectrum, it is best adapted for use as a "tweeter," being employed in one type of apparatus developed by applicant's assignee as a means for extending the range of the speaker system from about 7,000 cycles to about 20,000 cycles.

In practice it has been found that diaphragm tension which is adequate to insure proper spacing between the diaphragm and the backing plate results in a resonant frequency of the diaphragm in a region around 2,000 cycles, which is well below the response range of preferred embodiments.

To achieve the stiffness referred to, the diaphragm is placed under tension through the agency of an elongated means or element which is preferably constructed of metallic material and extends throughout the length of the diaphragm in confronting relation with respect to the concave side of the backing plate. Conveniently the tensioning element or member, which is shown at 21 in the drawing, comprises a channel which is U-shaped in cross-section, the web 22 of the channel bearing against exterior surface portions of the diaphragm 16. As indicated above it is these exterior surface portions which are provided with a conductive coating 18 and with the overlying protective layer 19, and the web 22 bears against the protective layer 19 to urge the diaphragm in such a direction, with respect to the backing plate, as to place the diaphragm under tension. If no protective layer is required, the web may of course bear directly against the conductive layer.

Preferably, and as illustrated, the diaphragm is urged toward the backing plate and into a concave shape generally conforming to the concavity of said backing plate. It will be recognized, however, that the tensioning means could be interposed between the diaphragm 16 and the concave surface of the backing plate 10, in which event it would urge the diaphragm away from said backing plate.

It has been found convenient to form the diaphragm sleeve by folding a flat sheet of material and securing adjacent folded edges, through the agency of a suitable adhesive, in an area which underlies the tensioning member. As shown in Figure 3, the sleeve is made of a laminar sheet including at least the base member and its conductive coating. In the event that a protective layer is used, as is preferred, said layer can also serve as the mentioned adhesive. Conveniently, the lapped or folded edges may be secured by bonding the protective layer 19 to the base sheet 17, as illustrated. The layer 19 is of thermo-plastic material, and the bond may be effected by the application of heat and pressure.

The tensioning member 21 is resiliently mounted upon the backing plate 10, opposite ends of the member 21 being secured to lugs 23 which project from the bracket 13 outwardly of the speaker assembly, and through which lugs pass screw members 24 which engage said opposite ends of the member 21, in the manner shown in Figures 1 and 2. A non-conductive grommet 25 maintains the screw member 24 out of conductive relation with the lug 23 (electrical contact to the screw member and to the tensioning member being provided for by a terminal 24a) and said screw member 24 is provided at its upper end with a shouldered portion 26 against which a coil spring 27 reacts to urge the tensioning member 21 downwardly, thereby to maintain the diaphragm under the necessary tension. It will be understood that adjustment of the projection of screw member 24, or variations in the strength or configuration of spring 27, make it possible to adjust the force which is utilized to maintain the tensioning member in resilient contact with the outer surface of the diaphragm 16. The fact that the tensioning member bears resiliently against the diaphragm is of advantage in that variations in diaphragm tension, resulting from temperature changes or from cold flow of the diaphragm material, are automatically compensated for.

As appears to best advantage in Figure 3 and as above stated, the web portion 22 of tensioning member 21 bears against the protective coating 19 and, in order that the tensioning member may serve also as a means for making electrical contact with the conductive coating 19 of the diaphragm—assuming that a protective layer is employed—it is necessary that means be provided to make this contact through said protective layer 19. It is important that this result be obtained without interfering with the protection afforded by the layer 19. To this end, and as shown at 28 in Figures 1 and 3, the web 22 of bar element 21 is provided with apertures and a conductive bonding medium, shown at 29 in Figure 3, contacts the web 22 and extends downwardly across the said walls of the apertures 28 into contact with the diaphragm as appears in Figure 3 at 29a. It has been found that this medium may comprise a metal paint, for example silver paint, which includes, as a solvent, acetone or methyl ethyl ketone.

Upon application of the metal paint 29, portions of the protective layer 19 which underlie the apertures 28 are dissolved by the mentioned solvent and an excellent conductive path is established between the web 22 and the conducting layer 18, the residual metal paint serving to protect the conductive layer in the region of the apertures 28 from which the protective layer has been removed. It will be appreciated that other specific materials could be utilized in the establishment of the desired conductive relation, the important factor being that contact be established between the web and the conductive coating 18 and through the mentioned protective layer 19.

In operation of an electrostatic speaker of the kind described above, the tensile forces set up in the diaphragm 16 through the agency of the channel member 21 maintain the plastic base sheet 17 of the diaphragm in bearing engagement with the ridges 15 provided upon the convex side of the backing plate 10. As already considered, sufficient stiffness is imparted to the diaphragm to prevent contact between said diaphragm and the backing plate in the apertured regions of the backing plate which lie between the ridges 15 (Figure 3). To space the diaphragm from the backing plate, along the lateral edges of the plate where the radius of plate curvature is short, a thin strip of flexible dielectric material 30 extends about said edge portions and along the length of the latter. (See particularly Figures 1 and 4.) The material 30 maintains a spacing, around the plate portions which are of short radius of curvature, approximately equal to the spacing maintained by the ridges 15. This is of importance since it minimizes the capacity of the non-vibratile portion of the diaphragm.

As is illustrated at 31 in Figure 1, a relatively narrow tape-like piece of dielectric material underlies the opposite ends of the diaphragm 16 extending about the curvature of the convex side of the backing plate. It is the purpose of this tape to prevent arcing between the diaphragm conductive coating 18 and the backing plate, around the edge of the diaphragm.

From the foregoing description it will be understood that by the present invention there is provided an improved electrostatic transducer which is of highly reliable type, and yet is susceptible of simple and inexpensive manufacture. The novel and improved means utilized to maintain the diaphragm under tension, and to make electrical contact therewith, is particularly characterized by the capability of imparting the necessary stiffness to the diaphragm without subjecting localized diaphragm areas to excessively high tensile stresses, as results when gripping or clamping devices of the prior art are resorted to.

It should be understood that various changes and modifications may be made in the preferred embodiment illustrated and described, without departing from the essential spirit of my invention. For example, the backing plate might be encased in insulating material, in which event a diaphragm of the kind described could be employed. If desired, however, the diaphragm might then consist solely of a thin, flexible metal sheet, and a modification of this kind is contemplated by definition of the backing plate as being electrically conductive and by certain broad definitions utilized in the appended claims and having reference to the construction of the diaphragm. It will be recognized, however, that the invention contemplates the foregoing and other changes and modifications which come within the scope of the appended claims.

I claim:

1. In an electro-acoustic transducer: a foraminous, electrically conductive, relatively rigid backing plate having a concave side and a convex side; a sleeve-like, continuous membranous diaphragm disposed about said backing plate, closely encircling said convex side, extending across said concave side and spaced therefrom; an electrically conductive layer on said diaphragm; and relatively rigid means for tensioning said diaphragm, confronting the concave side of said backing plate, and depressing said diaphragm toward said concave side to cause said diaphragm to bear forcibly against said backing plate and provide frictional force maintaining the position of said diaphragm.

2. In an electro-acoustic transducer: a foraminous, relatively rigid backing plate having a concave side and a convex side; a sleeve-like, continuous membranous diaphragm disposed about said backing plate, in spaced confronting relation with respect to the concave side of said backing plate and closely encircling the convex side of said plate; and a relatively rigid, bar-like member carried by said backing plate and reacting against said diaphragm, said member confronting the concave side of said backing plate and urging said diaphragm in such a direction, with respect to said backing plate, as to place the diaphragm under tensile force serving to maintain said diaphragm in position upon said backing plate.

3. In an electro-acoustic transducer: a foraminous, metallic, relatively rigid backing plate having a concave side and a convex side; a sleeve-like, dielectric, continuous membranous diaphragm disposed about said backing plate and extending substantially the full length of said plate, in spaced confronting relation with respect to the concave side of said backing plate and closely encircling the convex side of said plate, surface portions of said diaphragm, overlying said convex side, having conductive material thereon; and relatively rigid means carried by said backing plate and bearing against said diaphragm to tension the same, said means confronting the concave side of said backing plate, and urging said diaphragm toward said concave side and into a concave shape generally conforming to the concavity of said backing plate.

4. In an electro-acoustic transducer: a foraminous, electrically conductive, relatively rigid backing plate having a concave side and a convex side; a sleeve-like, dielectric, membranous continuous diaphragm disposed about said backing plate, surface portions of said diaphragm having conductive material thereon and said diaphragm disposed in spaced confronting relation with respect to the concave side of said backing plate and closely encircling the convex side of said plate, with portions of said diaphragm, in a region overlying said convex side, maintained out of contact with said plate; and means for tensioning said diaphragm and providing for the establishment of electrical contact between said conductive material and a source of potential, said means electrically conductive and confronting the concave side of said backing plate, said means having a portion disposed in electrical contact with the conductive surface portions of the diaphragm, and said means adjustably supported upon said backing plate and resiliently urging said diaphragm in such a direction, with respect to said backing plate, as to maintain the diaphragm under tensile force serving to position said diaphragm with respect to said backing plate.

5. In an electro-acoustic transducer: a foraminous, electrically conductive, relatively rigid backing plate having a concave side and a convex side; a sleeve-like, dielectric, membranous continuous diaphragm disposed about said backing plate and extending substantially the entire length of said plate, outer surface portions of said diaphragm having conductive material thereon and said diaphragm disposed in spaced confronting relation with respect to the concave side of said backing plate and closely encircling the convex side of said plate, with portions of said diaphragm, in a region overlying said convex side, maintained out of contact with said plate; and means for tensioning said diaphragm and providing for the establishment of electrical contact between said conductive material and a source of potential, said means electrically conductive and confronting the concave side of said backing plate, said means further bearing against said diaphragm in conductive relation with outer surface portions of the diaphragm, and said means adjustably supported upon said backing plate and urging said diaphragm toward the concave side of said plate.

6. Apparatus in accordance with claim 4, and including a protective layer of dielectric material overlying said conductive material, said apparatus further including metallic material disposed in contact with said last mentioned means and extending through said protective layer into conductive contact with said conductive material.

7. Apparatus in accordance with claim 4, and further characterized in that said means comprises an elongated metallic member having apertures therein confronting said conductive material and in which apparatus metallic material is disposed in said apertures and extends into conductive contact with said conductive material.

8. In an electro-acoustic transducer: a foraminous, electrically conductive, relatively rigid backing plate having a concave side and a convex side; a sleeve-like, dielectric, membranous continuous diaphragm disposed about said backing plate, outer surface portions of said diaphragm having conductive material thereon and said diaphragm disposed in spaced confronting relation with respect to the concave side of said backing plate and closely encircling the convex side of said plate, with portions of said diaphragm, in a region overlying said convex side, maintained out of contact with said plate; bracket means carried by said backing plate and providing for electrical connection of the latter to a source of potential; electrically conductive means for tensioning said diaphragm and providing for the establishment of electrical contact between said conductive material and a source of potential, said last means providing force securing said diaphragm to said backing plate, and means carried by said bracket means in confronting relation with respect to the concave side of said backing plate for carrying said tensioning means, said last means further bearing against said diaphragm and including a portion disposed in electrical contact with the conductive surface portions of the diaphragm, and said last means electrically insulated from said bracket means and reacting against the latter to urge the diaphragm in such a direction, with respect to said backing plate, as to maintain the diaphragm under tension.

9. Apparatus in accordance with claim 8, and further characterized in that said last means comprises an elongated metallic member bearing against said diaphragm substantially throughout the length of the latter, and in which apparatus a pair of the said bracket means is provided, the individual bracket means of said pair being disposed upon said backing plate in spaced relation, whereby to support opposite end portions of said elongated metallic member.

10. In an electro-acoustic transducer, a continuous sleeve-like, membranous, electrically conductive diaphragm; generally convex, electrically conductive backing means for said sleeve-like diaphragm; and means tensioning said sleeve-like diaphragm over said convex backing means, thereby providing frictional force maintaining the position of said diaphragm encircling said backing means.

11. Apparatus in accordance with claim 10 wherein said sleeve-like diaphragm is free of clamping engagement with said backing means as well as with said tensioning means.

References Cited in the file of this patent

UNITED STATES PATENTS

| | | |
|---|---|---|
| 1,753,137 | Seibt | Apr. 1, 1930 |
| 1,851,240 | Crozier | Mar. 29, 1932 |

FOREIGN PATENTS

| | | |
|---|---|---|
| 583,769 | Germany | Aug. 24, 1933 |

U. S. DEPARTMENT OF COMMERCE
PATENT OFFICE

CERTIFICATE OF CORRECTION

Patent No. 2,824,178     Lloyd J. Bobb          February 18, 1958

It is hereby certified that error appears in the printed specification of the above numbered patent requiring correction and that the said Letters Patent should read as corrected below.

Column 3, line 10, for (0.0025") read -- (0.00025") --.

Signed and sealed this 1st day of July 1958.

(SEAL)
Attest:
KARL H. AXLINE
Attesting Officer

ROBERT C. WATSON
Commissioner of Patents